(12) United States Patent
Slone

(10) Patent No.: US 6,646,086 B2
(45) Date of Patent: Nov. 11, 2003

(54) METHODS AND COMPOSITIONS INVOLVING POLAR MONOMERS AND MULTIVALENT CATIONS

(75) Inventor: Robert Victor Slone, Quakertown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/954,141

(22) Filed: Sep. 17, 2001

(65) Prior Publication Data

US 2002/0055599 A1 May 9, 2002

Related U.S. Application Data

(60) Provisional application No. 60/234,263, filed on Sep. 21, 2000.

(51) Int. Cl.[7] .............................................. C08F 118/02
(52) U.S. Cl. ........................ 526/319; 526/75; 526/78; 526/79; 526/80; 526/219.6; 526/229; 526/303.1; 526/307.2; 526/307.6; 526/307.7; 526/317.1; 526/318.4; 526/318.44; 526/329.2
(58) Field of Search .............................. 526/75, 78, 79, 526/80, 219.6, 229, 303.1, 307.2, 307.6, 307.7, 317.1, 318.4, 318.44, 319, 329.2

(56) References Cited

U.S. PATENT DOCUMENTS

| | | | |
|---|---|---|---|
| 2,531,396 A | 11/1950 | Carter et al. ................. | 260/41.5 |
| 2,883,356 A | 4/1959 | Gluesenkamp ................ | 260/37 |
| 4,739,007 A | 4/1988 | Okada et al. ................. | 524/789 |
| 4,798,867 A * | 1/1989 | Nakai et al. .................. | 525/196 |
| 4,867,902 A | 9/1989 | Russell ..................... | 252/186.23 |
| 4,889,885 A | 12/1989 | Usuki et al. .................. | 524/445 |
| 5,032,546 A | 7/1991 | Giannelis et al. .............. | 501/3 |
| 5,149,745 A | 9/1992 | Owens et al. ................. | 525/366 |
| 5,279,663 A | 1/1994 | Kaliski ....................... | 106/486 |
| 5,492,787 A * | 2/1996 | Matsunaga et al. ........ | 430/109.2 |
| 5,780,376 A | 7/1998 | Gonzales et al. ............. | 501/146 |
| 5,837,763 A | 11/1998 | Ferraro et al. ............... | 524/449 |
| 5,936,023 A | 8/1999 | Kato et al. ................... | 524/445 |
| 5,952,420 A | 9/1999 | Senkus et al. ................ | 524/548 |
| 5,962,553 A | 10/1999 | Ellsworth ..................... | 523/216 |
| 5,973,053 A | 10/1999 | Usuki et al. .................. | 524/445 |
| 6,034,164 A | 3/2000 | Elspass et al. ................ | 524/445 |
| 6,057,035 A | 5/2000 | Singh et al. .................. | 428/403 |

FOREIGN PATENT DOCUMENTS

| | | | | |
|---|---|---|---|---|
| EP | 0846662 A2 | 6/1998 | ............ | C01B/33/44 |
| GB | 2314335 | 12/1997 | ............ | C01B/33/44 |
| JP | 94041346 | 2/1994 | ............ | C08K/3/34 |
| WO | WO 95/14733 | 6/1995 | ............ | C08K/3/34 |
| WO | WO 97/00910 | 1/1997 | ............ | C08L/7/02 |
| WO | WO 00/29467 | 5/2000 | ............ | C08J/3/20 |
| WO | WO 01/36505 | 5/2001 | ......... | C08F/220/06 |

OTHER PUBLICATIONS

Luciow, et al., "Complexes of Poly(acrylic acid) With Some Divalent Trivalent and Tetravalent Metal Ions", European Polymer Journal, vol. 37, 2001, pp. 1741–1745.

Polimery–Twobzywa Wielkoczasteczkowe, "Kopolimery Soli Kwasow Akrylowych", 1973, pp. 128–130.

Polimery–Twobzywa Wielkoczasteczkowe, "Kopolimery Soli Kwasow Akrylowych", 1968, pp. 188–191.

Noh, et al., "Synthesis and Characterization of PS–clay Nanocomposite by Emulsion Polymerization", Polymer Bulletin, 42, (1999), pp. 619–626.

Choi, et al., "Characterization of Emulsion Intercalated Polymer–Na Montmorillonite Nanocomposite", Department of Polymer Science and Engineering, Inha University, Inchon, South Korea, pp. 247–248.

Noh, et al., "Comparison of Characteristics of SAN–MMT Nanocomposites Prepared by Emulsion and Solution of Polymerization", Department of Polymer Science and Engineering, Inha University, Inchon, South Korea, pp. 2811–2819.

Noh, et al., "Intercalation of Styrene–Acrylonitrile Copolymer in Layered Silicate by Emulsion Polymerization", Department of Polymer Science and Engineering, Inha University, Inchon, South Korea, pp. 179–188.

Lee et al., "Preparation and Characterization of PMMA––Clay Hybrid Composite by Emulsion Polymerization", Department of Polymer Science and Engineering, Inha University, Inchon, South Korea, pp. 1117–1122.

Lee, et al., "Charachterization of Epoxy–Clay Hybrid Composite Prepared by Emulsion Polymerization", Department of Polymer Science and Engineering, Inha University, Inchon, South Korea, pp. 1997–2005.

* cited by examiner

Primary Examiner—Tatyana Zalukaeva
(74) Attorney, Agent, or Firm—Ronald D. Bakule

(57) ABSTRACT

The present invention is directed, in part, to improved polymer compositions and processes for preparing same. Specifically, in one embodiment, there is provided a process for preparing a polymer, wherein the process comprises: providing a reaction mixture comprising a portion of at least one polar monomer and at least one multivalent cation; adding the remaining portion of the polar monomer to the reaction mixture; and polymerizing the monomer to form the polymer. In certain embodiments, the reaction mixture in the providing step comprises at least two molar equivalents or greater of the total amount of polar monomer with respect to one molar equivalent of multivalent cation.

21 Claims, No Drawings

METHODS AND COMPOSITIONS INVOLVING POLAR MONOMERS AND MULTIVALENT CATIONS

CROSS REFERENCE TO RELATED PATENT APPLICATIONS

This is a non-provisional application of prior now abandoned U.S. provisional application serial No. 60/234,263 filed Sep. 21, 2000.

The present invention relates generally to polymeric compositions comprising polar monomers and multivalent cations. More particularly, the present invention relates to monophasic compositions comprising polar monomers that exhibit improved physical properties through the addition of a multivalent cation prior to polymerization. This invention also relates to the use of these improved compositions as, for example, coatings, polishes, sealants, caulks, adhesives, and plastics additives.

Complexes which comprise salts of various metals added to emulsions or dispersions containing polar monomers are known in the art. The reference article Roma-Luciow et al., "Complexes of Poly(Acrylic Acid) with Some Divalent, Trivalent and Tetravalent Metal Ions", E. Polymer J., 37 (2001), pp. 1741–45 ("Roma-Luciow") discloses metal complexes of poly(acrylic acid) or PAA with various metal salts such as chromium, iron, aluminum, bismuth, vanadium, uranium, nickel, copper, zinc, cobalt, calcium, barium, cerium, lanthane, and neodynium. The complexes disclosed in Roma-Luciow may be used, inter alia, as precursors in the elaboration of ceramics. The Roma-Luciow article compared and categorized the speed of exchange of water and of the carboxyl ligand for complexes having different metal salts.

Multivalent cations are oftentimes added to polymers or copolymers polymerized from polar monomers to improve the physical or chemical properties of the composition. For example, multivalent cations may be added after the polymer or copolymer has been formed to modify various functional groups present on the polymer chain. In a polymer or copolymer containing methacrylic acid ("MAA"), the carboxylic acid may be fully or partially neutralized by the addition of a cation to form a salt. It is believed that the addition of a cation may form ionic bonds with the negatively charged oxygen ions within the polymer or copolymer. These ionic bonds may lead to crosslinking of the polymer or copolymer chains. In this regard, a salt formed with a divalent cation may foster an ionic "cross-link" between the two copolymer chains. The resulting polymeric composition may be stronger as a result of this ionic "cross-link". However, the presence of too much cation within the system could destabilize the polymer latex. Further, ionic cross-links that are formed post-polymerization may require the diffusion of polymer chains to form the ionic cross-links. This requirement generates a kinetic barrier to the ionic cross-linking and, oftentimes, may result in the failure of the system to form the maximum number of allowable cross-links from the given amount of multivalent cations.

U.S. Pat. No. 5,149,745 issued to Owens et al. ("Owens") discusses reacting a previously formed acid-functional polymer with a transitional metal compound at a temperature above the Tg of the polymer to produce a crosslinked polymer. Owens teaches that the transitional metal compound must be relatively insoluble in water to prevent the compound from producing excessively high amounts of multivalent cations in solution. High levels of multivalent cations can cause dispersions or emulsions of acid-containing polymer to coagulate out of the emulsion or aqueous dispersion due to the multivalent cation instability of the polymer.

Multivalent cations may also be added to alter the physical or chemical properties of a polymer composition by providing distinct, inorganic phases within the polymeric material. U.S. Pat. No. 5,952,420 issued to Senkus et. al. ("Senkus") discloses pressure-sensitive adhesive polyacrylate microparticulate composites that are obtained via suspension polymerization of an aqueous mixture that comprises an acrylic acid ester of a nontertiary alcohol, a polar monomer, a styrene sulfonate salt, and an amount of surfactant above the critical micelle concentration. Water insoluble, metal cations in the form of metal oxide salts are added to the aqueous mixtures as suspension stabilizer modifiers. The resultant composite formed in Senkus comprises distinct phases of inorganic materials such as activated carbon, silica gel or alumina granules bonded together with the pressure-sensitive adhesive microparticulate in the mass of inorganic material. These multi-phasic or nonhomogeneous polymer-inorganic composites may exhibit a greater water sensitivity, water whitening, and poor film appearance which may be disadvantageous for certain applications such as pressure sensitive adhesives. Moreover, the composites of Senkus may fail to obtain the maximum number of cross-links from the given amount of multivalent cations.

WO 01/36505 issued to Young et. al. ("Young") also discloses the addition of a multivalent cation in the form of a water insoluble salt to modify the physical and chemical properties of the polymeric composites. Young discloses suspension polymerized composites comprised of ionomeric particulates that modify the polymer matrix that it is compatible with to form an organic particulate-filled adhesive. Like Senkus, the resultant polymer-inorganic composite is comprised of more than one phase and suffers from many of the same disadvantages.

The present invention provides a polymeric composition with improved physical properties without adding a multivalent cation after polymerization. Instead, the present invention uses a multivalent cation, preferably a water soluble cation, to form a complex in situ with a portion of the polar monomer prior to and/or during polymerization. Further, the present invention provides a polymeric composition with improved physical properties without the formation of multiple inorganic phases. It is thus surprising and unexpected that the physical properties of polymeric compositions having polar monomers may be improved through the addition of a soluble cation salt, typically a multivalent cation, prior to and/or during polymerization and the staged addition of the polar monomer. The staged addition of the polar monomer and the addition of the cation salt may create a polymer or polymer latex with a high degree of ionic cross-linking without compromising polymer or polymer latex stability. Moreover, the present invention avoids gellation and gritting problems that are oftentimes experienced with the addition of a multivalent cation.

The present invention is directed, in part, to improved polymer compositions and processes for preparing same. Specifically, in one embodiment, there is provided a process for preparing a polymer, wherein the process comprises: providing a reaction mixture comprising a portion of at least one polar monomer and at least one multivalent cation; adding a mixture comprising the remaining portion of the polar monomer to the reaction mixture; and polymerizing the monomer to form the polymer. In certain embodiments, the reaction mixture in the providing step comprises at least two molar equivalents or greater of the total amount of polar monomer with respect to one molar equivalent of multivalent cation.

In another embodiment of the present invention, there is provided a process for preparing a polymer, wherein the process comprises: providing a reaction mixture comprising at least one polar monomer, at least one multivalent cation, and optionally at least one ethylenically unsaturated monomer; providing a monomer mixture comprising at least one polar monomer and optionally at least one ethylenically unsaturated monomer; adding the monomer mixture to the reaction mixture; and polymerizing the monomer to form the polymer.

In a further embodiment of the present invention, there is provided a process for preparing a polymer, wherein the process comprises: providing a reaction mixture comprising at least one polar monomer, at least one multivalent cation, and optionally at least one ethylenically unsaturated monomer wherein the at least one multivalent cation is soluble within a solvent; providing a monomer mixture comprising at least one polar monomer; adding a portion of the monomer mixture to the reaction mixture to form a polymer seed; adding the remainder of the monomer mixture to the reaction mixture on a gradual basis; and polymerizing the monomer to form the polymer.

These and other aspects of the invention will become more apparent from the following detailed description.

The present invention is directed to processes for improving the physical properties of polymer compositions, preferably aqueous polymer latex compositions, by promoting cross linked sites between portions of the negatively charged polar monomer and the positively charged cation contained therein prior to and/or during polymerization. The present polymer compositions may advantageously exhibit an improved balance of properties in comparison to polymer compositions prepared by methods of the prior art. In particular, the polymer compositions of this invention may exhibit improved strength properties, preferably without incurring additional processing steps after polymerization or without creating distinct inorganic phases within the composition. The present invention also provides methods for improving a variety of polymer compositions, preferably aqueous polymer compositions, prepared by emulsion, solution, suspension, solvent, bulk, or other polymerization methods, through the addition of a multivalent cation and the staged addition of the polar monomer. The combination of the polar monomer and the multivalent cation to form, for example, a complex, may be used at any point prior to and/or during the polymerization.

It has now been found that the addition of a cation, typically a metal cation, to form a complex with a polar monomer prior to the addition of the remainder of the polar monomer and the polymerization of the monomer, may desirably foster the attraction between the negatively charged functional groups within the polar monomer and the multivalent cation. The enhanced attraction between the polar monomer and cation results in a polymer latex with improved physical properties such as increased tensile strength. Although the present invention is discussed with respect to emulsion-based polymers or aqueous polymer latex dispersions, it is understood that the methods of the present invention are suitable for a variety of polymerization methods such as, but not limited to, solution or suspension polymerization techniques. Indeed, the present invention is suitable for any polymerization technique in which a partially or completely negatively charged monomer, oligomer, or stabilizer is attracted to the positive charge of the multivalent cation and may participate in the polymerization.

In certain embodiments of the present invention, the polymer is prepared via an emulsion-based polymerization technique to form an aqueous polymer latex dispersion. Any conventional emulsion polymerization technique for preparing an aqueous dispersion of polymer latex particles from ethylenically unsaturated monomers may be employed such as single or multiple shot batch processes, and continuous processes. The preparation of polymeric latexes is discussed generally in R. G. Gilbert, *Emulsion Polymerization: A Mechanistic Approach*, Academic Press, NY ($1^{st}$ Edition, 1995) and El-Aasser, *Emulsion Polymerization and Emulsion Polymers*, John Wiley and Sons, NY (1997). The preparation of acrylic polymeric latexes is described in, for example, Emulsion Polymerization of Acrylic Polymers, Bulletin, Rohm and Haas Company, Philadelphia. In some embodiments, two separate reaction mixtures such as a first aqueous reaction mixture and a second aqueous reaction mixture or monomer mixture, may be prepared initially, followed by a multi-stage emulsion polymerization of the monomer within the reaction mixtures. While the present application discusses multi-stage polymerization primarily in terms of two stages, it is understood that more than two stages of polymerization of the monomer is further envisioned. The terms "stage", "multi-stage", and "core shell", as used herein, is intended to encompass their broadest possible meaning, such as, for example, the meaning conveyed in U.S. Pat. Nos. 3,793,402, 3,971,835, 5,534,594, and 5,599,854, which disclose various means for achieving "staged" and "multi-staged" and core shell polymers. The first reaction mixture typically comprises a combination, complex, or mixture of the multivalent cation source and a portion of the polar monomer, surfactant and/or emulsifier, and optionally one or more ethylenically unsaturated monomers, whereas the second reaction mixture comprises the remainder of the polar monomer and optionally one or more ethylenically unsaturated monomers. In alternative embodiments, the remainder of the polar monomer may be added neat to the first aqueous reaction mixture. Depending upon the end use of the aqueous polymer latex dispersion, the polar monomer in the first aqueous reaction mixture and the second aqueous reaction mixture of monomer emulsion may be the same or may differ. The term "aqueous polymer latex dispersion" refers to a polymer latex that further comprises an aqueous, or water phase.

The aqueous polymer latex dispersion contains polymerized units derived from at least one type of ethylenically unsaturated monomer. The term "units derived from", as used herein, refers to polymer molecules that are synthesized according to known polymerization techniques wherein a polymer contains "units derived from" its constituent monomers. Preferably, the ethylenically unsaturated monomer is selected such that the polymerized units within the aqueous polymer latex dispersion are water insoluble, i.e., have low or no water solubility.

The preparation of the monomer mixture typically involves the vigorous mixing of at least one ethylenically unsaturated monomer with water and, optionally, an emulsifier. In other embodiments of the present invention the monomer may be added "neat", i.e., added without water. The amounts of monomer, water, and emulsifier in the monomer mixture may vary depending upon, for example, the particular monomer and/or emulsifier selected, the intended end-use, the polymerization technique, and the like. In certain embodiments, the amount of monomer in the monomer mixture is preferably in the range of from 25 to 100, preferably from 40 to 90, and even more preferably from 60 to 80 weight percent. The amount of water in the monomer mixture, if aqueous based, is preferably in the range of from 0.1 to 75, more preferably from 10 to 60, and even more preferably from 20 to 40 weight percent based on the total weight of the emulsified monomer mixture (e.g., monomers, emulsifier, and water). The amount of emulsifier, if added, in the monomer mixture is preferably in the range of from 0.01 to 10, preferably from 0.05 to 2, and even more preferably from 0.1 to 1 weight percent.

The monomers which may be polymerized include any of the ethylenically unsaturated monomers commonly known in the art, such as those listed in *The Polymer Handbook, 3$^{rd}$ Edition*, Brandrup and Immergut, Eds., Wiley Interscience, Chapter 2, (1989). Suitable ethylenically unsaturated monomers include, for example, the $C_1$–$C_{18}$ alkyl (meth)acrylate monomers (e.g., methyl-, ethyl-, propyl-, n-butyl-, sec-butyl-, tert-butyl, pentyl-, isobornyl-, hexyl-, heptyl-, n-octyl-, 2-ethylhexyl-, decyl-, undecyl-, dodecyl-, lauryl, cetyl, and stearyl-(meth)acrylate and the like); vinyl aromatic monomers (e.g., styrene, alpha-methyl styrene, para-methyl styrene, chlorostyrene, vinyl toluene, dibromostyrene, tribromostyrene, vinyl naphthalene, isopropenyl naphthalene, divinylbenzene and the like); vinyl esters (e.g., vinyl acetate; vinyl versatate; and the like); vinyl-unsaturated carboxylic acids monomers (e.g., methacrylic acid, acrylic acid, maleic acid, itaconic acid); nitrogen-containing vinyl unsaturated monomers (e.g., acrylonitrile, methacrylonitrile, and $C_1$–$C_{18}$ alkyl (meth)acrylamides, and the like); dienes (e.g., butadiene and isoprene); ethylene, hydroxyethyl(meth)acrylate, hydroxypropyl(meth)acrylate, and the like. The term "alkyl (meth)acrylate", as used herein, refers to both esters of alkyl acrylate and alkyl methacrylate.

For the purposes of preparing aqueous polymer latex compositions having desirable resistance to weathering, it is preferred to use monomers selected from the class of alkyl (meth) acrylates. For the purposes of providing low cost and commercially available aqueous polymer latex dispersions, it is preferable that the ethylenically unsaturated monomer be selected from the group consisting of $C_1$–$C_{18}$ alkyl methacrylate, $C_1$–$C_{18}$ alkyl acrylate, acrylic acid, methacrylic acid, butadiene, vinylaromatic monomers, and the like. For the purposes of using the aqueous polymer latex dispersions for preparing coatings and adhesives, it is preferable to use $C_1$–$C_{18}$ alkyl (meth)acrylate monomers; acrylic acid; methacrylic acid; itaconic acid; vinyl acetate; vinyl versatate; vinyl aromatic monomers, and the like. It may be even more preferable to use n-butyl acrylate, ethyl acrylate, butyl methacrylate, methyl methacrylate, styrene, butadiene, acrylic acid, and methacrylic acid monomers for the purpose of providing aqueous polymer latex dispersions in a variety of applications due to their relatively low cost and commercial availability.

In certain embodiments, the monomer mixture in the first and/or the second aqueous reaction mixtures may be emulsified. In these embodiments, suitable emulsifiers may include, but are not limited to, those conventionally used in emulsion polymerization, such as salts of alkyl-, aryl-, aralkyl-, alkaryl-sulfates or sulfonates; alkyl-, aryl-, aralkyl-, alkaryl-poly(alkoxyalkyl) ethers; alkyl-, aryl-, aralkyl-, alkaryl-poly(alkoxyalkyl) sulfates; alkali salts of long-chain fatty acids such as potassium oleate, typically alkyl diphenyloxide disulfonate; and the like. The preferred emulsifiers may include, for example, dodecyl benzene sulfonate and dioctyl sulfosuccinate. Additional emulsifiers may include, for example, non-ionic surfactants such as ethyloxylated alcohols.

Where it is desirable to covalently crosslink the polymers and/or to graft link multiple stage polymers, crosslinkers and/or graftlinkers may also be included in the monomer mixture(s). The term "crosslinker", as used herein, refers to multi-functional monomers capable of forming two or more covalent bonds between polymer molecules of the same type. The term "graftlinker", as used herein, refers to multi-functional monomers capable of forming two or more covalent bonds between polymer molecules of one type with polymer molecules of another type. Suitable crosslinkers or graftlinkers include, for example, divinyl benzene, butylene glycol di(meth)acrylate, alkanepolyol-polyacrylates or alkanepolyol-polymethacrylates such as ethylene glycol di(meth)acrylate, oligoethylene glycol diacrylate, oligoethylene glycol dimeth-acrylate, trimethylol-propane diacrylate, trimethylolpropane dimeth-acrylate, trimethylolpropane triacrylate ("TMPTA") or trimethylolpropane trimethacrylate, and unsaturated carboxylic acid allyl esters such as allyl acrylate, diallyl maleate, and typically allyl methacrylate, and the like.

At least one of the monomers within the reaction mixture is a polar monomer. The term "polar monomer", as used herein, describes a monomer with a partially or completely negative charge. Examples of these monomers include, but are not limited to, monomers containing carboxylic acid, phosphate, or sulfate functional groups. Still further examples of polar monomers are monomers that include hydroxyl, ester, ether, aldehyde and ketone functional groups. Preferably, the polar monomer is a carboxylic acid containing monomer. The term "acid containing monomer", as used herein, refers to any ethylenically unsaturated monomer that contains one or more acid functional groups or functional groups that are capable of forming an acid, such as an anhydride, for example, methacrylic anhydride, maleic anhydride, or itaconic anhydride. Examples of acid containing monomers include, for example, carboxylic acid bearing ethylenically unsaturated monomers such as acrylic acid ("AA"), methacrylic acid ("MAA"), itaconic acid ("IA"), maleic acid and fumaric acid; acryloxypropionic acid and (meth)acryloxypropionic acid; sulphonic acid-bearing monomers, such as styrene sulfonic acid, sodium vinyl sulfonate, sulfoethyl acrylate, sulfoethyl methacrylate, ethylmethacrylate-2-sulphonic acid, or 2-acrylamido-2-methylpropane sulphonic acid; phosphoethylmethacrylate ("PEM"); the corresponding salts of the acid containing monomer; or combinations thereof. In these embodiments, the total amount of acid containing monomer within the system may range from 0.01 to 100 weight percent, preferably from 0.1 to 20 weight percent, and even more preferably from 0.1 to 5 weight percent.

In other embodiments of the present invention, the polar monomer relates to polar oligomers or unsaturated oligomers, such as trimers, that have a partially or completely negative charge and which have one or more points of unsaturation, such as terminal unsaturation. In certain other embodiments of the present invention, the polar monomer relates to low molecular weight polymeric stabilizers that may be soluble in base (i.e., contain many $CO_2H$ groups and are alkali soluble). Some non-limiting examples of these polar, polymeric stabilizers include MOREZ™ 101 or TAMOL™ 731, both of which are manufactured by Rohm and Haas, Inc. of Philadelphia, Pa. In these embodiments, the amount of polar stabilizer within the system may range from 1 to 50 weight percent, more preferably from 15 to 50 weight percent.

In certain preferred embodiments, the first aqueous reaction mixture includes a complex comprising a monomer mixture of at least one polar monomer and the multivalent cation. Preferably, the polar monomer is an acid containing monomer. In these embodiments, a portion of the polar monomer within the overall composition is added to the first aqueous reaction mixture containing the multivalent cation to form, for example, a complex between the monomer and the cation, and the remainder of the polar monomer is added to the second aqueous reaction mixture or added neat. The amount of polar monomer that is added to the first aqueous reaction mixture is at least two molar equivalents to one molar equivalent of multivalent cation within the reaction mixture. In embodiments involving acid-containing monomers, it is believed that this allows the acid functional groups to bond to the cations and remain there during the polymerization process. This staged method of polar monomer addition may advantageously result in an improvement in physical properties in comparison to the straight addition of all of the polar monomer to the second aqueous reaction mixture or monomer emulsion.

In embodiments where the acid-containing monomer is staged, the amount of acid staged in the first aqueous reaction mixture containing the multivalent cation can range from greater than 0% to less than 100% of the total acid charged within the aqueous polymer latex dispersion. The second aqueous reaction mixture, or the remaining portion of polar monomer that is added to the first aqueous reaction mixture, may contain from 0% to 100%, preferably 1% to 50%, more preferably 5% to 25%, and even more preferably 5% to 15% of the remaining acid containing monomer within the aqueous polymer latex dispersion.

The optimal amount of acid containing monomer will vary by the composition of the reaction mixture and the acid type, however, the amount of acid containing monomer will generally be at a level which is two times or greater than the molar amount of divalent (or higher valency) ions added to the first aqueous reaction mixture. In this regard, the amount of polar monomer that is added to the system is in an amount sufficient to neutralize the charge of the multivalent cation within the system. The term "neutralize", as used herein, refers to balancing a positive charge with a negative charge. For example, the optimal amount to neutralize the charge of the multivalent cation between an acid containing monomer and a divalent cation would include at least two molar equivalents of the acid containing monomer to one molar equivalent of the divalent cation. This may result in a complex of two acid groups to one divalent cation. Similarly, in the case of the addition of trivalent cations, the amount of acid containing monomer relative to the amount of trivalent cation would include at least two, preferably three, molar equivalents of the acid containing monomer to one molar equivalent of the trivalent cation. Thus, the optimal amount of acid containing monomer and cation within the complex may employ only as much acid containing monomer as necessary in the first aqueous reaction mixture to neutralize the charge of the acid containing monomer to the cation; the remaining amount of acid containing monomer within the second aqueous reaction mixture may then aid in stabilizing the growing polymer latex particles.

A cation, preferably a multivalent cation, more preferably at least one divalent or trivalent cation, and even more preferably at least one divalent or trivalent metal cation, is added to the first reaction mixture. The addition of the cation to the reaction mixture containing a portion of the polar monomer results, for example, in the formation of an in situ complex within the reaction mixture. The cation is preferably soluble, i.e., is present at a level such that all of the cation may dissolve in a solvent. In preferred embodiments, the solvent is water and the cation is water soluble. The cation may preferably be added to the reaction mixture in the form of a slurry or a solution. In certain embodiments of the present invention, the cation is added in the form of a solution containing a metal salt comprising at least one divalent and/or trivalent cation. Preferably, the metal salt is dissolved in water or other solvent. Examples of such metal salts include, but are not limited to $Ca(OH)_2$, $Mg(OH)_2$, or $Mg(SO_4)$. Further non-limiting examples of metal salts, comprising divalent or trivalent cations, are provided in U.S. Pat. No. 5,998,538. The selection of the cation is influenced by the final use of the polymer or polymer latex whereas the selection of the anion in the metal salt influences the solublity and latex stability. For example, a halide anion, such as Cl, may destabilize the polymeric latex. As mentioned previously, the cation is present in an amount sufficient, for example, to form a complex in-situ with a portion of the polar monomer in the reaction mixture to neutralize the cation. In certain embodiments of the present invention, the amount of the cation that is added to the reaction mixture ranges from 0.001 to 10 weight percent, more preferably from 0.001 to 5 weight percent, and even more preferably from 0.1 to 1 weight percent, based upon the dry weight of the monomer and the amount of polar monomer within the polymer or aqueous polymer latex dispersion.

The cation may be added to the reaction at any point during the polymerization process to foster the attraction between the negatively charged polar monomer and the cation within the system and improve the physical properties of the polymer. Prior to the addition of the cation, the percentage of monomer that is polymerized is from 0 to 90%, more preferably from 0 to 50%. Preferably, the cation may be added to the reaction prior to the polymerization of the monomer to form the polymer or before the polymerization step. This mode of addition typically results in greater improvements in the physical properties of the polymer compared with adding the cation after polymerization.

In the third step of one embodiment of the present invention, the first and second aqueous reaction mixtures, or the reaction mixture and the remaining polar monomer, are multi-stage emulsion polymerized. Such multi-stage emulsion polymerization preferably involves the sequential polymerization of two or more monomer mixtures wherein the monomers of the first monomer mixture are polymerized to more than 80%, preferably more than 90%, and even more preferably more than 95% degree of conversion to form a polymer particle dispersion. This polymerization is preferably followed by the polymerization of a second monomer mixture containing the remaining polar monomer in the presence of the polymer particle dispersion to form additional polymers which may associate with the polymer particles (e.g., polymer shells around or domains within the polymer particles) and/or form additional polymer particles, such as core shell polymers.

The emulsion polymerization step is typically carried out in a suitable reactor wherein the reactants (monomers, initiators, optional emulsifiers, multivalent cation, and optional chain transfer agents) are suitably combined, mixed, and reacted in an aqueous medium, and wherein heat may be transferred into, and away from, the reactor. The reactants are preferably added slowly (gradually, as in a semi-batch process) over time, continuously, or quickly as a "shot" (batchwise) into the reactor. Typically, the reactants are gradually added ("grad-add") to the reactor.

In other embodiments of the present invention, the polymeric compositions of the present invention may be prepared through techniques other than emulsion polymerization. For example, these compositions may be polymerized via bulk polymerization techniques, i.e., polymerization without added solvents or water. In other embodiments, solution polymerization techniques may be used if the heat of polymerization of the monomer or viscosity of the polymer is too high. Preferably, the polymerization occurs in an aqueous medium but other mediums, or solvents, may be used. However, some disadvantages with solution polymerization may be removal of the solvent at the completion of the reaction or chain transfer reactions with the solvent which may limit molecular weight.

In other embodiments of the present invention, the monomer within the polymer latex may be polymerized by suspension polymerization. In these embodiments, the monomer is mechanically dispersed in a liquid medium and is polymerized as droplets. The liquid medium is preferably water, however other media, such as perfluorocarbons, may also be used. The addition of one or more stabilizers to the suspension, along with mechanical agitation, aid in preventing agglomeration of the monomer droplets. Further non-limiting examples of suspension polymerization are provided in George Odian, *Principles of Polymerization,* 2nd ed. John Wiley and Sons, NY (1981), pp 287–288.

In further embodiments of the present invention, the polymer colloids of the present invention may be prepared via mini-emulsion polymerization techniques. The term "colloid" as used herein refers to particles having a number average particle size range from 0.05 to 1 $\mu$m. The term "mini-emulsion polymerization", as used herein, generally relates to methods involving stable submicron oil-in-water dispersions in which the monomer droplets within the dispersion may range in size from 0.05 to 1 $\mu$m. Further discussion of mini-emulsion polymerization techniques is provided in "Mini-emulsion Polymerization" by E. D. Sudol et al., *Emulsion Polymerization and Emulsion Polymers,* John Wiley and Sons, NY (1997), pp. 700–722. The references, Erdem et al., "Encapsulation of Inorganic Particles via Mini-emulsion Polymerization", Proc. Am. Chem. Soc. (Div Polym Mater Sci Eng) 1999, 80, 583 and Erdem et al., "Encapsulation of Inorganic Particles via Mini-emulsion Polymerization. III. Characterization of Encapsulation", Journal of Polymer Science: Part A: Polymer Chemistry, Vol. 38, 4441–4450 (2000), provides some exemplary methods for mini-emulsion polymerization. The dispersion is typically obtained by shearing a system comprising oil, water, surfactant, and, optionally, a co-surfactant. Due to the small droplet size of the aqueous dispersion, it is believed that the monomer droplets within the mini-emulsion may become the dominant site for particle nucleation.

The stability of the monomer droplets within the mini-emulsion may arise from the use of a stabilizer in conjunction with an optional costabilizer. The stabilizer may include, for example, any of the surfactants mentioned herein. In embodiments where a costabilizer is used, the costabilizer is preferably a low molecular weight, water insoluble compound such as, for example, cetyl alcohol, hexane, or hexadecanol. The amount of surfactant that may be added to the mixture is from 0.1% to 10%, preferably from 0.5% to 5%, and more preferably from 1% to 4% by weight, based upon the weight of monomer within the mixture. The amount of co-surfactant, if added, to the mixture is from 0.1% to 15%, preferably from 1% to 10%, and more preferably from 2% to 8% by weight, based upon the weight of monomer within the mixture.

Various initiator systems are known in the art of free radical initiation and may be used in the methods described herein. The selection of the initiator system may vary depending upon the polymerization technique used. A thermal initiator, such as, but not limited to, a persulfate salt may be used. Alternatively, a free radical redox initiator system may also be employed. Examples of such systems include, for example, an oxidizing agent or oxidant such as a persulphate, azo, peroxide (e.g., hydrogen peroxide, t-butyl hydroperoxide, t-amylhydroperoxide), and the like in combination with a reducing agent or reductant such as sodium metabisulphite, sodium bisulfite, sodium sulfoxylate formaldehyde, sodium dithionite, isoascorbic acid, sodium hydrosulphite, 2-hydroxy-2-sulfinatoacetic acid, 2-hydroxysulfonatoacectic acid, and the like. It is believed that the presence of non-ionic surfactants within the present invention may act as a phase transfer catalyst and aid in the delivering the multivalent cation to the polar groups within the polar monomer.

The free-radical initiators which are typically used in the various steps of the process are those conventionally utilized in free-radical redox polymerizations conducted in the temperature range from 10° C. to 100° C., preferably from 20° C. to 95° C., and more preferably from 55° C. to 90° C. Temperatures higher than 100° C. are possible using equipment that is designed for elevated pressures. In some embodiments involving redox initiation, initiation temperatures are preferably kept below 85° C., more preferably below 55° C. In other embodiments involving thermal initiation with persulfate salts, temperatures in the range 80° C. to 90° C. are used.

In one embodiment of the present invention, the monomers may be added batch-wise ("shot") or fed continuously or gradually adding over time into the reactor. Continuous feeding by gradual addition of the aqueous reaction mixtures into the reactor over times from 0.5 to 18 hours, preferably from 1 to 12 hours, and even more preferably from 2 to 6 hours, is useful for controlling reaction temperature.

Buffers may also be present in the reaction mixture during an emulsion polymerization. Buffers are generally the salts of weak acids such as, but not limited to, sodium bicarbonate, sodium carbonate or sodium acetate. The amount of buffer that may be present, if added, in the reaction mixture may range from 0.01 to 5 weight percent based upon the total monomer utilized in the polymerization. Generally lower levels of a strong base, such as ammonia or sodium hydroxide, can also be used to control the pH of the polymerization. These agents may be added at any time either before, during, or after the polymerization step. Buffers may be further used to control hydrolysis of certain monomers, influence the extent of premature crosslinking during polymerization (as in the case when N-methylolacrylamide monomer is employed), influence the rate of decomposition of initiators, and/or affect the extent of dissociation of carboxylate acid monomers and surfactants to control colloidal stability.

Optionally, at least one chain transfer agent may be incorporated during polymerization to control the molecular weight of the polymer. Examples of chain transfer agents include, but are not limited to, mercaptans, polymercaptans, and polyhalogen compounds. Further non-limiting examples of chain transfer agents include alkyl mercaptans such as ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan; mercapto carboxylic acids and their esters, such as methyl mercaptopropionate and 3-mercaptopropionic acid; alcohols such as isopropanol, isobutanol, lauryl alcohol and t-octyl alcohol; and halogenated compounds such as carbon tetrachloride, tetrachloroethylene, and tricholoro-bromoethane. Generally from 0 to 10% by weight, based on the weight of the monomer mixture, can be used. The polymer molecular weight may also be controlled by other techniques, such as selecting the ratio of initiator to monomer.

A stabilizing surfactant may be added to the reaction mixture to discourage the aggregation of polymeric latex particles. In general, the growing latex particles are stabilized during emulsion polymerization by one or more surfactants such as an anionic or nonionic surfactant, or a mixture thereof. Examples of surfactants suitable for emulsion polymerization are provided in *McCutcheon's Detergents and Emulsifiers* (M C Publishing Co., Glen Rock, N.J.), published annually. Other stabilizing agents, such as protective colloids can be used.

The reaction mixture may be polymerized in the presence of a pre-formed polymer dispersion ("seed" latex), for controlling the desired particle size. Seeds are also typically used for controlling the structure and/or morphology of the resulting polymer. The "seed" latex may comprise small particles, having a mean diameter less than 200 nm, preferably less than 100 nm, and even more preferably less than 65 nm. Typical seed latex particles may have a composition similar to, or different than, the composition of the monomers used in preparing the first stage of the multistage polymer latex or the first stage of a seeded single stage polymer latex polymer. The pre-formed polymer dispersion may include polymer particles of a rubbery material, and may be similar or different in composition to the core polymer. The term "rubbery", as used herein, denotes the thermodynamic state of a polymer above its glass transition temperature. Alternatively, the seeds may include hard non-rubbery polymer particles, (e.g., polystyrene or polymethyl methacrylate), which may be used for adjusting refractive index, as taught in Myers et al., U.S. Pat. No. 3,971,835.

Another process of the present invention involves the gradual addition and polymerization of an aqueous dispersion containing at least one polar monomer that has been neutralized by the addition of a cation to one or more emulsion polymer seeds. The emulsion polymer seeds may be formed in the same reactor vessel where the monomers are polymerized or prepared in a separate reactor vessel and subsequently introduced to the reactor vessel where the monomers are polymerized. In this process, the emulsion polymer seeds preferably have a particle diameter of 20 to 500 nm, more preferably 30 to 400 nm, and even more preferably 40 to 300 nm. The emulsion polymer seeds are from 0.1 to 10%, preferably 0.5% to 8%, even more preferably 1% to 5% based on dry weight of the total polymer weight in said polymer latex dispersion. The aqueous dispersion in this process contains 80 to 99.95%, preferably 85 to 99.9%, and even more preferably from 90 to 99.9% based on dry weight of the total dry polymer weight in the polymer latex dispersion of at least one ethylenically unsaturated monomer. After polymerization of each stage, it is desirable that at least 95%, preferably at least 97%, and even more preferably at least 99% based on weight of the monomer is polymerized in a reactor before a subsequent polymerization stage is begun.

The aqueous polymer latex dispersions of the present invention may also be prepared utilizing inverse emulsion polymerization. The processes described in, for example, U.S. Pat. Nos. 3,284,393, 3,826,771, 4,745,154, and accompanying references therein, can be incorporate, for example, a multivalent cation and polar monomer complex into the aqueous phase of these polymerizations when used to make an acid containing polymer (high or low levels of acid). Inverse emulsion polymerization methods may yield high molecular weight polymers or copolymers based on the water soluble monomers and mixtures comprised thereof. An aqueous solution of these monomers may be dispersed in an oil phase by means of a water in oil emulsifier and subsequently polymerized under free radical forming conditions.

The aqueous polymer latex dispersions of the present invention may be useful, for example, as coatings, polishes, sealants, caulks, adhesives, and as plastics additives. The coating compositions comprising aqueous polymer latex dispersions may exhibit improved properties like block, print and dirt pick-up resistance, enhanced barrier properties, scrub resistance, toughness, sheer strength, and wear resistance. Suitable applications for the coating compositions of the present invention may include architectural coatings (particularly low VOC applications for semi-gloss and gloss); factory applied coatings (metal and wood, thermoplastic and thermosetting); maintenance coatings (e.g., over metal); automotive coatings; concrete roof tile coatings; elastomeric roof coatings; elastomeric wall coatings; external insulating finishing systems; and inks. The aqueous polymer latex dispersions of the present invention may be useful as additives, dispersants, alkali soluble resins, acid functional thickeners. It is further contemplated that the aqueous polymer latex dispersions, when provided as an additive to a coating application, may impart hardness. Yet further non-limiting examples of applications for the aqueous polymer latex dispersions: polish; binders (such as binders for nonwovens, paper coatings, pigment printing, or ink jet); adhesives (such as pressure sensitive adhesives, flocking adhesives, or other water based adhesives); plastics additives; ion exchange resins; hair fixatives; caulks; and sealants. The aqueous polymer latex dispersion may impart strength and toughness to the aforementioned applications. Further, polish compositions comprising aqueous polymer latex dispersions may exhibit enhanced properties such as solvent resistance and strippability. Additionally, pressure sensitive adhesive compositions comprising aqueous polymer latex dispersions may exhibit enhanced properties such as optical clarity and water resistance.

In one embodiment of the present invention, the aqueous polymer latex dispersions are capable of forming films upon drying (e.g., coatings and adhesives). In this embodiment, it is preferred that the polymers of the polymer latexes have a glass transition temperature in the range of from −80° C. to 50° C. Glass transition temperatures may be calculated by using the Fox equation (see T. G. Fox, Bull. Am. Physics Soc., Vol. 1, Issue No. 3, page 123(1956)).

An additional embodiment of the present invention contemplates preparing a coating composition containing an aqueous polymer latex dispersion. The coating composition of this invention may include, for example, coating or paint compositions which may be described in the art as architectural coatings, maintenance coatings, factory-applied coatings, automotive coatings, elastomeric wall or roof coatings, exterior insulating finishing system coatings, paper or paperboard coatings, overprint varnishes, fabric coatings and backcoatings, leather coatings, cementitious roof tile coatings, and traffic paints. Alternatively, the coating or paint compositions may be described as clear coatings, flat coatings, satin coatings, semi-gloss coatings, gloss coatings, primers, textured coatings, and the like. In these embodiments, it is preferred that the polymers of the polymer latexes have glass transition temperatures that range from 0° C. to 70° C.

The coating composition may further include pigments and/or fillers such as, for example, titanium dioxide, iron oxide, zinc oxide, magnesium silicate, calcium carbonate, organic and inorganic colored pigments, and clay. Such pigmented coating compositions preferably contain from 3 to 70% pigment on a volume basis, and more preferably from 15 to 60% titanium dioxide on a volume basis.

The coating compositions of the present invention may be prepared by a variety of techniques which are well known in the coatings art. In certain embodiments, at least one pigment is well dispersed in an aqueous medium under high shear mixing, such as by a COWLES™ mixer or, alternatively, at least one predispersed pigment may be used. Then, the aqueous polymer latex dispersion is added to the aqueous pigment mixture under low shear stirring along with other coatings adjuvants, if desired. Alternatively, the aqueous polymer latex dispersion may be included in the optional pigment dispersion step. The coating composition may also contain conventional coatings adjuvants such as, for example, tackifiers, emulsifiers, coalescing agents, plasticizers, buffers, neutralizers, thickeners or rheology modifiers, humectants, crosslinking agents including heat-, moisture-, light-, and other chemical- or energy-curable agents, wetting agents, biocides, plasticizers, antifoaming agents, colorants, waxes, water repellants, slip or mar aids, anti-oxidants, and the like. The coating composition, in addition to the aqueous polymer latex dispersion described herein, may also contain at least one or more additional polymers. These additional polymers are preferably emulsion polymers selected from either film-forming and non-film-forming emulsion polymers that include solid or hollow polymeric pigments, and may be present at a level of 0–200%, based on dry weight of the total dry polymer weight in the polymer latex dispersion.

The solids content of the coating composition may be from 10% to about 70% by volume. The viscosity of the coating composition may be from 0.05 to 100 pascal-seconds (Pa·s), or 50 to 100,000 centipoise (cP), as measured using a Brookfield viscometer. The viscosity of the coating composition may vary depending upon the method of coating application.

The coating composition may be applied by conventional application methods such as, for example, brushing and spraying methods such as, for example, roll coating, doctor-blade application, printing methods, air-atomized spray, air-assisted spray, airless spray, high volume low pressure spray, air-assisted airless spray, air knife coating, trailing blade coating, curtain coating, and extrusion.

The coating composition may be applied to a substrate such as, for example, paper or paperboard; consolidated wood products; glass; plastic; wood; metal; primed or previously painted surfaces; weathered surfaces; asphaltic substrates; ceramics; leather; and hydraulic substrates such as cement in "green" or cured form, concrete, gypsum, and stucco. The coating composition applied to the substrate is typically dried, or allowed to dry, at a temperature from 10° C. to 95° C.

In another embodiment of this invention, an adhesive composition containing an aqueous polymer latex dispersion is provided. The various components, processes, and uses of the aforementioned coating compositions are preferably applicable to these polymer latex-containing adhesive compositions.

In another embodiment of this invention, caulking and sealant compositions containing an aqueous polymer latex dispersion are provided. The various components, processes, and uses of the aforementioned coating compositions are preferably applicable to these polymer latex-containing caulking and sealant compositions. In addition, caulking and sealant compositions preferably have a paste-like or gel-like consistency and preferably have higher viscosities than do coatings. Accordingly, caulks and sealants can be prepared using the aqueous polymer latex dispersions of the present invention according to the general formulations known in the art of preparing caulks and sealants from emulsion polymers. In this embodiment, caulks and sealants can be prepared by blending fillers with the aqueous polymer latex dispersions according to methods known in the art.

In some embodiments of this invention, the aqueous polymer latex dispersions desirably form films upon drying, with or without the addition of plasticizers or coalescents (e.g., coatings and adhesives). In these embodiments, it is preferred that the polymers of the polymer latexes have glass transition temperatures in the range of from −80° C. to 50° C.

In another embodiment of this invention, an adhesive composition containing an aqueous polymer latex dispersion is contemplated. The adhesive compositions may include, for example, those known in the art as pressure sensitive adhesives, laminating adhesives, packaging adhesives, hot melt adhesives, reactive adhesives, flocking adhesives, and flexible or rigid industrial adhesives. In these embodiments it is preferred that the polymers of the polymer latexes have glass transition temperatures in the range of from −80° C. to 80° C. The adhesives are typically prepared by admixing optional pigment and the optional adjuvants listed herein above as coatings adjuvants. The adhesive compositions are typically applied to substrates including plastic substrates such as film, sheet, and reinforced plastic composites; metal foil; fabric; metal; glass; cementitious substrates; and wood or wood composites. Application to the substrates is typically effected on machine by transfer roll coater, e.g., or by manual application devices.

In another embodiment of this invention, a caulk or sealant composition containing an aqueous polymer latex dispersion is contemplated. In these embodiments it is preferred that the polymers of the polymer latexes have glass transition temperatures in the range of from −80° C. to 0° C. The caulk or sealant compositions are typically prepared by admixing pigment and such optional adjuvants listed hereinabove as coatings adjuvants as are appropriate. The caulk and sealant compositions are typically prepared at high solids content level such as 70 wt. % and above in order to minimize shrinkage on drying and consequently, may have a gel-like or paste-like consistency. Caulk and sealant compositions are typically applied to fill and/or seal junctions of substrates including metal; glass; cementitious substrates; wood or wood composites; and combinations thereof and are typically allowed to dry under ambient conditions.

In another embodiment of this invention, an ink composition containing an aqueous polymer latex dispersion is contemplated. The ink compositions may include, for example, those known in the art as flexographic inks, gravure inks, ink jet inks, and pigment printing pastes. In these embodiments it is preferred that the polymers of the polymer latexes have glass transition temperatures in the range of from −50° C. to 50° C. The inks are typically prepared by admixing optional pigment, predispersed pigment, or dyes and the optional adjuvants listed herein above as coatings adjuvants. The ink compositions are typically applied to substrates including plastic substrates such as film, sheet, and reinforced plastic composites; paper or paperboard; metal foil; fabric; metal; glass; cloth; and wood or wood composites. Application to the substrates is typically effected on machine by flexographic blankets, gravure rolls, silk screens.

In a further aspect of the present invention, a digital imaging composition incorporating an aqueous polymer latex dispersion and/or polymer latex particles is contemplated. The term "digital imaging" as used herein generally relates to compositions that allow the reproduction of an image onto a substrate. Suitable applications for digital imaging compositions include toners for electrophotography such as xerography or compositions for ink jet printers or similar applications. The Tg and particle size for digital imaging compositions varies depending upon its method or system of use. Generally, digital imaging compositions for ink jet applications may have a lower particle size and Tg compared to the particle size and Tg for digital imaging compositions for electrophotography applications. For example, typical Tg values for ink jet applications may range from 45° C. to 60° C. whereas Tg values for electrophotography applications may range from 55° C. to 85° C. Further, non-limiting variables such as viscosity, surface tension, and pH of the digital imaging composition may also be adjusted based upon the end use of the composition.

In another embodiment of this invention, a nonwoven fabric binder containing an aqueous polymer latex dispersion is contemplated. The nonwoven binder compositions may include, for example, those known in the art as binders for consumer and industrial nonwovens such as wipes and interlining, binders for insulating nonwovens such as fiberfill and fiberglass, and binders/strengthening agents for nonwovens and paper such as oil filter paper. In these embodiments it is preferred that the polymers of the polymer latexes have glass transition temperatures in the range of from −60° C. to 50° C. The nonwoven fabric binders are typically prepared by admixing optional pigment, and the optional adjuvants listed herein above as coatings adjuvants, as appropriate. The nonwoven fabric binder compositions are typically applied to substrates including nonwovens formed from cellulosic fibers such as paper and rayon; synthetic fibers such as polyester, aramid, and nylon; glass fibers and mixtures thereof. Application to the substrates is typically effected on machine by saturation bath, roll coater, spray, or the like.

In another embodiment of this invention, a polish containing an aqueous polymer latex dispersion is contemplated. The polish compositions may include, for example, those known in the art as floor polishes, furniture polishes, and automobile polishes. In these embodiments it is preferred that the polymers of the polymer latexes have glass transition temperatures in the range of from 0° C. to 50° C. The polishes are typically prepared by admixing optional pigment, and the optional adjuvants listed herein above as coatings adjuvants, as appropriate, particularly waxes. The polish compositions are typically applied to substrates including wood, vinyl or polyurethane flooring, ceramic tiles, painted metal, and the like. Application to the substrates is typically effected by spray, roller, mop, or the like.

In another embodiment of this invention, a plastics additive containing an aqueous polymer latex dispersion is contemplated. The plastics additive compositions may include, for example, those known in the art as processing aids and impact modifiers. In these embodiments it is preferred that the polymers of the polymer latexes have glass transition temperatures in the range of from −50° C. to 50° C. The plastics additives are typically prepared by admixing optional pigment, and the optional adjuvants listed herein above as coatings adjuvants, as appropriate, and, typically, drying the composition to a powdered form. The plastics additives compositions are typically mixed with the plastic such as, for example, polyvinyl chloride, polymethyl methacrylate and polypropylene, by milling or extrusion.

In another aspect of the present invention, the emulsion polymer of the polymer latex may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the Tg for the purpose of this invention is to be calculated by the Fox equation using the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

In other aspects of the present invention, the emulsion polymer of the polymer latex may be prepared by an emulsion polymerization process which is executed in such a manner to produce a bimodal or mutimodal particle size distribution as is taught in U.S. Pat. Nos. 4,247,438; 4,657,966; and 5,498,655, a bimodal or multimodal molecular weight distribution as is taught in U.S. Pat. Nos. 4,501,845 and 5,990,228, or non spherical particles such as, for example, rods as are taught in U.S. Pat. No. 5,369,163 and multilobal particles as are taught in U.S. Pat. No. 4,791,151.

In another aspect of the present invention, the emulsion polymer of the polymer latex may be prepared by a process which produces particles which may function in a manner instead of or in addition to providing binder functionality. Contemplated are emulsion polymers which function as pigment dispersants or thickeners/rheology modifiers such as alkali-soluble, acid-soluble, and hydrophobically-modified emulsion polymers.

In certain aspects of the present invention, the aqueous polymer latex dispersions may be used in polymer compositions incorporating high levels of acid functionality. These polymer compositions are useful as additives in water based systems as thickeners (see, for example, U.S. Pat. No. 4,421,902 and references therein), dispersants (see, for example, U.S. Pat. Nos. 5,326,843 and 3,037,952 and references therein) and binders (see, for example, U.S. Pat. No. 5,326,843 and U.S. Pat. No. 4,876,313 and references therein) as well as coatings, inks, adhesives and the like. When the polymer latex compositions prepared in accordance with the method of the present invention are incorporated into high acid polymer compositions, the resultant polymer may increase in hardness. This imparts properties such as enhanced block resistance (i.e., the coating will not stick to itself or other items) when used in a paint composition. Ink binders, that are comprised entirely or partially of high acid polymers, will exhibit enhanced heat seal resistance (block resistance at elevated temperature) and toughness when the polymer latex compositions are added to the binder composition. In yet another embodiment utilizing high acid polymers, the polymer latex compositions of the present invention may be used as dry powder polymer cement modifiers (such as described in, for example, EP0654454 and references therein).

EXAMPLES

Example 1

0.18% Ca(OH)$_2$/MAA/Na$_2$CO$_3$ Addition Order

A latex was prepared via the following method: An empty reactor kettle was charged with 612.00 g deionized water and 5.08 g anionic surfactant (30% aqueous solution). The reaction mixture was heated to 85° C. and then a multivalent ion slurry containing 1.84 g of Ca(OH)$_2$ in 5.00 g DI water was added to the reaction mixture. Next, a quantity of 7.55 g of methacrylic acid ("MAA") was then charged to the kettle followed by 3.10 g sodium carbonate (foaming was observed). In a separate vessel, a monomer emulsion was prepared containing 426.60 g water, 36.90 g anionic surfactant (30% aqueous solution), 662.00 g Butyl Acrylate ("BA"), 342.70 g Methyl Methacrylate ("MMA"), and 7.55 g methacrylic acid ("MAA"). A 55.80 g quantity of the monomer emulsion was added to the reaction mixture to form a polymer seed. Then, a quantity of 4.03 g ammonium persulfate dissolved in 28 g water was added to the reaction mixture to initiate polymerization. The monomer emulsion was fed into the kettle such that a reactor temperature of 85° C. was maintained. After monomer feeds were completed, the batch was cooled to 65° C., and upon reaching 65° C. 5.58 g ferrous sulfate (0.15% aqueous) was added to the reactor. Then, a 1.12 g quantity of 70% tert-butyl hyperoxide in 20.00 g of water was added along with a 0.56 g quantity of isoascorbic acid in 20.00 g water. The temperature was reduced to below 45° C. The pH of the batch was raised to 7.5 using ammonium hydroxide (28% aqueous) and a bactericide (4.77 g Kathon LX (1.4% aqueous) with 6.20 g water) was added. The sample was filtered through a 100 mesh screen to remove any large pieces of coagulated material.

Example 2

0.09% Ca(OH)$_2$/MAA/Na$_2$CO$_3$ Addition Order

A latex was prepared in the same manner as Example 1 except that a weight percentage of 0.09% calcium hydroxide by weight of monomer content was used.

Example 3

0.05% Ca(OH)$_2$/MAA/Na$_2$CO$_3$ Addition Order

A latex was prepared in the same manner as Example 1 except that a weight percentage of 0.05% calcium hydroxide by weight of monomer content was used.

Example 4

0.07% Mg(OH)$_2$/MAA/Na$_2$CO$_3$ Addition Order

A latex was prepared in the same manner as Example 1 except that a weight percentage of 0.07% magnesium hydroxide (equimolar in divalent ion content with Example 2) by weight of monomer content was used.

Example 5

0.04% Mg(OH)$_2$/MAA/Na$_2$CO$_3$ Addition Order

A latex was prepared in the same manner as Example 1 except that a weight percentage of 0.04% magnesium hydroxide (equimolar in divalent ion content with Example 3) by weight of monomer content was used.

Example 6

0.17% Mg(SO$_4$).7H$_2$O/MAA/Na$_2$CO$_3$ Addition Order

A latex was prepared in the same manner as Example 5 except that a weight percentage of 0.04% magnesium sulfate heptahydrate (equimolar in divalent ion content with Examples 3 and 5) by weight of monomer content was used.

Comparative Example 7

0.18% Ca(OH)$_2$/Reduced MAA Stage/Na$_2$CO$_3$ Addition Order

A latex was prepared in the same manner as Example 1 except that the percentage of acid containing monomer, or MAA, that was charged to the reaction kettle in the beginning of the reaction was reduced from 50% to 14%.

Comparative Example 8

0% Ca(OH)$_2$/MAA/Na$_2$CO$_3$ Addition Order

A latex was prepared in the same manner as Example 1 except that no divalent ion was charged and the and the percentage of acid containing monomer charged to the kettle in the beginning of the reaction was reduced from 50% to 0%.

Comparative Example 9

0.18% Ca(OH)$_2$/MAA/Na$_2$CO$_3$ Addition Order

A quantity of 0.18% calcium hydroxide by weight of monomer charged was added to the latex made in Comparative Example 8. This example represents the prior approach of forming ionic crosslinks by bringing together an already formed polymer containing acid group side chains with a divalent ion salt.

Tensile Strength Testing

The polymers of Examples 1 through 6 and Comparative Examples 7 through 9 were made into sample films of unformulated coatings and tested for the tensile properties of maximum tensile strength. The test data for each film was collected on a Tinius Olsen Benchtop Universal Testing Machine (manufactured by Tinius Olsen Testing Machine Company, Willow Grove, Pa.). The sample films were pulled at a rate of 5.08 cm/min. The testing machine was calibrated for the film thickness, width, and weight of each sample film. The initial distance between the clamps holding the sample being tested is 2.54 cm. The tests were conducted in a controlled environment room with a temperature of 22° C. and a humidity level of 50%. The tensile measurements for each film are provided in the following Table I.

As the results in Table I illustrate, the addition of a multivalent ion slurry containing Ca or Mg improved the overall tensile properties of the polymer in comparison to polymers without the addition of the multivalent ion slurry or Example 8C. Higher tensile strength measurements are also observed by staging the acid containing monomer. In some instances, such as in Example 1, the tensile strength of the resultant polymer is nearly 4 times that of the polymer without the addition of the multivalent ion slurry or the staged acid containing monomer. Further, having a higher percentage of the acid containing monomer in the reaction kettle, or 50% MAA in Example 1 vs. 14% in Example 7C, prior to the addition of the monomer seed to the reaction kettle also results in increased tensile strength. Lastly, adding the multivalent ion slurry prior to polymerization of the monomer within the reaction vessel such as in Example 1, results in a higher tensile strength polymer than adding the multivalent ion slurry after polymerization such as in Example 9C.

TABLE I

Tensile Properties Versus Method of Cation and Acid Addition

| Ex # | Description | Divalent Ion and Level | Acid Staged[1] | Tensile$_{max}$[2] |
|---|---|---|---|---|
| 1 | Pre-Comp | 0.18% Ca(OH)$_2$ | 50% MAA | 351 psi |
| 2 | Pre-Comp | 0.09% Ca(OH)$_2$ | 50% MAA | 206 psi |
| 3 | Pre-Comp | 0.05% Ca(OH)$_2$ | 50% MAA | 138 psi |
| 4 | Pre-Comp | 0.09% Mg(OH)$_2$ | 50% MAA | 199 psi |
| 5 | Pre-Comp | 0.05% Mg(OH)$_2$ | 50% MAA | 136 psi |
| 6 | Pre-Comp | 0.05% Mg(SO$_4$) | 50% MAA | 182 psi |
| 7C | Reduced MAA Stg. | 0.18% Ca(OH)$_2$ | 14% MAA | 110 psi |
| 8C | Control | None | None | 88 psi |
| 9C | Post-Add | 0.18% Ca(OH)$_2$ | None | 98 psi |

[1]Percent of total acid charge that is added just after the divalent ion. Overall composition of samples is: 65.0 BA/33.5 MMA/1.5 MAA
[2]Tensile$_{max}$ values are +/− 5 psi.

We claim:

1. A process for preparing a polymer, wherein the process comprises the steps of:
   a. providing a reaction mixture comprising a portion of at least one polar monomer, and at least one soluble multivalent cation bearing an ionic charge;
   b. providing a monomer mixture comprising the remaining portion of the polar monomer;
   c. adding the monomer mixture to the reaction mixture; and
   d. polymerizing the monomer to form the polymer.

2. The process of claim 1 wherein the reaction mixture in the providing step comprises at least 25% by weight of the total amount of polar monomer.

3. The process of claim 2 wherein the reaction mixture in the providing step comprises at least 50% by weight of the total amount of polar monomer.

4. The process of claim 1 wherein the amount of the polar monomer relative to the amount of the multivalent cation, in molar equivalents, is at least two to one.

5. The process of claim 4 wherein the amount of the polar monomer relative to the amount of the multivalent cation is sufficient to neutralize the ionic charge of the multivalent cation.

6. The process of claim 1 wherein said polar monomer comprises an acid containing monomer.

7. The process of claim 6, wherein said acid containing monomer is selected from the group consisting of: methacrylic anhydride, acrylic acid, methacrylic acid, itaconic acid, maleic acid, fumaric acid, acryloxypropionic acid, (meth)acryloxypropionic acid, styrene sulfonic acid, ethylmethacrylate-2-sulphonic acid, 2-acrylamido-2-methylpropane sulphonic acid; phosphoethylmethacrylate the corresponding salts of the acid containing monomer, and combinations thereof.

8. The process of claim 1, wherein said polar monomer comprises a polar oligomer.

9. The process of claim 1 wherein said polar monomer comprises a low molecular weight, polymeric stabilizer.

10. The process of claim 1 wherein the multivalent cation comprises at least one cation selected from the group consisting of divalent cations and trivalent cations.

11. The process of claim 1 wherein the reaction mixture further comprises at least one ethylenically unsaturated monomer.

12. The process of claim 11 wherein the at least one ethylenically unsaturated monomer is selected from the group consisting of: $C_1$–$C_{18}$ alkyl (meth)acrylate, 2-ethylhexyl (meth)acrylate, isobornyl (meth)acrylate, lauryl (meth)acrylate, allyl (meth)acrylate, stearyl (meth)acrylate, acrylic acid, itaconic acid, methacrylic acid, butadiene, vinyl acetate, vinyl versatate, styrene, vinyl aromatic monomers, divinylbenzene, divinylpyridine, divinyltoluene, diallyl phthalate, butylene glycol di(meth)acrylate, ethylene glycol di(meth)acrylate, divinylxylene, divinylethylbenzene, divinylsulfone, divinylketone, divinylsulfide, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N-methylene dimethacrylamide, N,N-methylene dimethacrylamide, N,N-ethylenediacrylamide, trivinylbenzene, and the polyvinyl ethers of glycol, glycerol, pentaerythritol, resorcinol, monothio and dithio derivatives of glycols, and combinations thereof.

13. The process of claim 1 wherein said polymerizing step comprises emulsion polymerization.

14. The process of claim 1, wherein said polymerizing step comprises solution polymerization.

15. The process of claim 1, wherein said polymerizing step comprises suspension polymerization.

16. The process of claim 1 wherein said polymerizing step comprises mini-emulsion polymerization.

17. The process of claim 1 wherein the glass transition temperature of said polymer is in the range of from −80° C. to 50° C.

18. The process according to claim 1, wherein the glass transition temperature of said polymer is in the range of from −80° C. to 140° C.

19. The process of claim 1 wherein the multivalent cation is water soluble.

20. The process of claim 1 wherein the solvent comprises water.

21. The process of claim 1, wherein step c) is preformed such that a portion of the monomer mixture is first added to the reaction mixture to form a polymer seed, and the remainder of the monomer mixture is subsequently added to the reaction mixture containing the polymer seed, over a period of time.

* * * * *